United States Patent [19]

Brown et al.

[11] 4,203,322
[45] May 20, 1980

[54] APPARATUS FOR THE ULTRASONIC MEASUREMENT OF THE FLOW VELOCITY OF FLUENT MEDIA

[75] Inventors: Alvin E. Brown, Claremont; William E. Van Over, Monrovia, both of Calif.

[73] Assignee: E. I. Du Pont de Nemours and Company, Wilmington, Del.

[21] Appl. No.: 837,843

[22] Filed: Sep. 29, 1977

[51] Int. Cl.$^2$ .............................................. G01F 1/66
[52] U.S. Cl. .................................................. 73/194 A
[58] Field of Search ...................... 73/194 A, 597, 598

[56] References Cited

U.S. PATENT DOCUMENTS

| | | | |
|---|---|---|---|
| Re. 28,929 | 8/1976 | Brown | 73/194 A |
| 3,890,837 | 6/1975 | Frizzell et al. | 73/194 E |
| 3,981,191 | 9/1976 | Brown et al. | 73/194 A |
| 4,114,439 | 9/1978 | Fick | 73/194 A |

*Primary Examiner*—Charles A. Ruehl

[57] ABSTRACT

In an ultrasonic flowmeter ultrasonic signals are transmitted alternately upstream and downstream of a fluent media whose flow velocity is to be ascertained. The repetition rate at which signals are transmitted is controlled by a voltage controlled oscillator. To increase the sensitivity of the meter, the frequency of the voltage controlled oscillator, which is related to sound speed through the fluent media, is increased.

4 Claims, 5 Drawing Figures

| TRANSMIT | RECEIVE | | S 30 $\frac{f_1+f_2}{2}$ | S 39 $\frac{f_1-f_2}{2}$ | S 43 $f_1$ | S 44 $f_2$ |
|---|---|---|---|---|---|---|
| | DOWNSTREAM | UPSTREAM | | | | |
| 1 | ←$t_v$→ S13, S17, S11, ←$t_1$→ | S13, S11 | + | 0 | + | + |
| 2 | | | − | 0 | − | − |
| 3 | | | 0 | + | + | − |
| 4 | | | 0 | − | − | + |
| 5 | | | 0 | 0 | 0 | 0 |

+ = RISES     − = FALLS     0 = UNCHANGED

APPARATUS FOR THE ULTRASONIC MEASUREMENT OF THE FLOW VELOCITY OF FLUENT MEDIA

BACKGROUND OF THE INVENTION

This invention relates to ultrasonic flowmeters and, more particularly, to a method and apparatus for the ultrasonic measurement of the flow velocity of fluent media.

Various ultrasonic flow measuring devices are known in which signal frequencies are related to the downstream speed of sound $f_1$ and the upstream speed of sound $f_2$. Typically, a voltage controlled oscillator is used to provide a reference signal after a predetermined number of oscillations. A comparator compares the actual arrival time of the transmitted ultrasonic signal to that of the reference signal. If this actual arrival time is earlier than the time of occurrence of the reference signal, the frequency of the oscillator is increased to adjust the timing of the reference signal to occur at the actual arrival time of the ultrasonic signal. If, on the other hand, the actual arrival time of the ultrasonic signal is later than the reference signal, the frequency of the oscillator is reduced. The frequencies $f_1$ and $f_2$ may be processed to determine flow velocity $(f_1-f_2)/2$ or sonic velocity $(f_1+f_2)/2$.

In another flowmeter, such as that described in U.S. Pat. No. Re. 28,929, a signal level generator is added to the timing circuitry. Signals are applied to the input of the signal level generator to vary the signal level according to whether the respective upstream and downstream arrival signals are early or late relative to a reference signal. Even here, a voltage controlled oscillator, whose frequency is selected as a measurement of the sonic velocity, is used to control the transmission of the signals and also the reference signal. An improvement over this sytem is described in U.S. Pat. No. 3,981,191.

All of the described ultrasonic flow measuring systems, as well as an older flow measuring system based on the so-called "sing-around" principle, have one feature in common. This feature is that there is either a signal level generator or oscillator functioning as a timing generator for providing the reference criteria from which sound speed and flow speed of the fluid media are obtained.

A problem often arises in using these ultrasonic flowmeters in that sometimes the desired degree of sensitivity is not always as high as one might wish to attain. This is particularly true in measuring flow in larger diameter pipes. Because of the longer transmission times of the ultrasonic signals in large pipes, small changes in flow rate constitute a smaller part of the total transmission time. Sensitivity is hence decreased.

Accordingly, it is an object of this invention to provide a method for increasing the sensitivity of ultrasonic flowmeters.

Another object of this invention is to provide an improved apparatus for increasing the sensitivity of ultrasonic flowmeters.

SUMMARY OF THE INVENTION

According to the invention, apparatus for measuring the flow rate of a fluid stream by repetitively transmitting ultrasonic signals upstream and downstream includes a frequency related timing function generator for controlling the times at which ultrasonic signals are so transmitted, control means responsive to said ultrasonic signals and to said generator for providing first and second control signals that are proportional, respectively, to the upstream and downstream speeds of sound for controlling said generator, and a means for increasing the repetition rate at which the ultrasonic signals are transmitted, whereby said control means associates a received ultrasonic signal with a transmitted ultrasonic signal following that which actually initiated said received signal.

In one embodiment of the invention the repetition rate is increased by a factor of two and in still another embodiment the repetition rate is increased by a factor which is the ratio of the normal time difference between a first of said upstream ultrasonic transmitted signals and its received signal on the one hand and a second of said upstream ultrasonic transmitted signals and said received signal on the other hand.

According to the method of the invention, the sensitivity of an ultrasonic flowmeter, which measures the flow rate of a fluid stream by repetitively transmitting ultrasonic signals upstream and downstream and which has a frequency related signal that is proportional to the sound speed in said fluid stream, is increased. The sensitivity of such a flowmeter is increased by adjusting the frequency related signal to correspond to a higher sound speed than actually exists in the fluid stream. In this manner the flowmeter associates a received pulse with a pulse following the transmit pulse normally used. Because the apparent transmission time through the stream is decreased, small changes in flow rate represent a larger part of the apparent transmission time and hence sensitivity is increased.

BRIEF DESCRIPTION OF THE DRAWINGS

Further advantages and features of this invention will become apparent upon consideration of the following description wherein.

DESCRIPTION OF THE PREFERRED EMBODIMENTS

Figure 1:
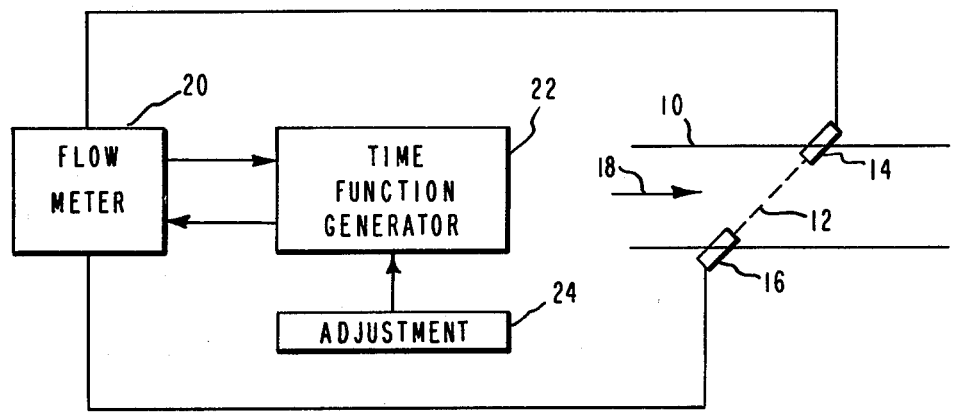
FIG. 1 is a block diagram of a typical flowmeter modified in accordance with this invention so as to increase its sensitivity.

There may be seen, particularly with reference to FIG. 1, a channel or pipe 10 through which there is fluid flow. The flow rate of this fluid flow may be measured using an ultrasonic measuring path 12 which is defined by a pair of ultrasonic transducers 14 and 16, respectively, disposed transversely to the direction of flow 18 of the flow stream of the fluent medium through the pipe 10. The ultrasonic measuring path 12 is a path over which ultrasonic pulses or signals are passed sometimes in sequential, more frequently in alternate, upstream and downstream directions from the respective transducers 14 and 16. These transducers 14 and 16 are shock excited by a DC impulse provided by a flowmeter 20. The flowmeter 20, by way of example, may be any of those known in the prior art such as is described in U.S. Pat. Nos. Re. 28,929, 3,981,191, German specification No. 2,322,749 or a conventional "sing-around" flowmeter. All of these meters have in common the fact that each contains a time function generator which controls the times at which the ultrasonic pulses are transmitted and, in some, generates a reference pulse which is used to determine the flow velocity of the fluent medium in a wellknown manner. More specifically, the flowmeter described in U.S. Pat. No. 3,981,191 will be described in detail in reference to FIGS. 3 and 4. Suffice it to say at the moment that the flowmeter 20 includes a time function generator 22 which provides a frequency related signal, typically derived from a voltage controlled oscillator, related to sound speed in the fluent medium. This sound speed signal, according to well-known techniques, as is described in said patents, is used to control the timing in the flowmeter 20. An adjusting means, such as a potentiometer 24, is used to control the frequency of this voltage controlled oscillator.

In accordance with this invention the frequency of the voltage controlled oscillator is increased, thereby increasing the apparent sound speed (which is related to this frequency) so that the receiver portion of the flowmeter 20 associates a received pulse with a transmitted pulse following that one which actually initiated the received signal. The flowmeter itself is able to lock onto or synchronize with such an intermediate pulse so that the meter is in effect measuring time over a shorter span such that the normal changes in transit time between upstream and downstream signals are a greater proportion of the apparent measured period. This increases the sensitivity of the meter.

Figure 2:
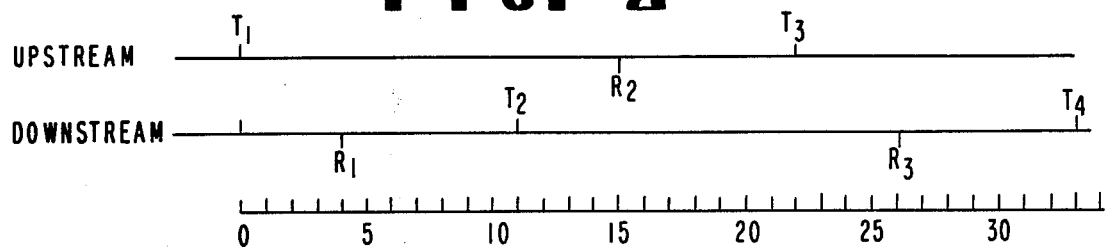
FIG. 2 is a timing diagram useful in explaining the manner in which the apparatus illustrated in FIG. 1 may function in accordance with the method of this invention.

This may perhaps be more easily understood with reference to FIG. 2 in which the usual timing wave forms for the upstream and downstream signals depict, for the upstream and downstream transducers 12 and 14, respectively, the transmitted and received ultrasonic pulses. Thus the upstream transducer 16 transmits a first pulse $T_1$, which under the timing typically employed in a flowmeter such as that described in U.S. Pat. No. 3,981,191, has a typical 4/7 distribution of received and transmitted pulses. This transmitted pulse $T_1$ will be received at the downstream transducer 14 at the time $R_1$ four units of time later. After seven more units of time, the downstream transducer 14 transmits the second pulses $T_2$ which is received by the upstream transducer four units of time later at $R_2$. Next, after seven units of time, the upstream transducer 16 transmits the third pulse $T_3$ which is received by the downstream transducer 14 four units of time later as pulse $R_3$.

With large diameter pipes, the pulse $T_1$ transmitted by the upstream transducer 16 may not be received at the time $R_1$ but might not be received until $R_3$. Under these conditions, it is possible to increase the frequency of the timing generator voltage controlled oscillator by a factor, in this case 26 periods (the time from $T_1$ to $R_3$) divided by four (the time period from $T_3$ to $R_3$) or a factor of 6.5. The tracking range of the meter is forced to a higher point, the apparent sound speed of the meter being higher by a factor of 6.5. With this particular ratio the actual received pulse $R_3$ from the pulse transmitted at the time $T_1$ will appear to the meter as if it was transmitted in effect at the time $T_3$. Since the flow sensitivity is a function of the flow time differential with respect to transit time, the flow sensitivity will be 6.5 times higher. Stated in another manner, by increasing the frequency of the timing generator, which frequently is related to sound speed, the control means of the meter associates a received ultrasonic signal with a transmitted ultrasonic signal following that which actually initiated the received signal.

In alternative embodiments, the apparent sound speed may be increased even further. In this particular case, depicted with the timing diagram of FIG. 2, the oscillator may be increased, for example, by a factor of 12 (i.e., 48 divided by 4) and so on. Care must be taken to not increase sound speed too much since this has a tendency to reduce the allowable sound speed changes in the pipe being measured. Hence if sound speed is increased too greatly the measurement must be limited to relatively constant temperature (sound speed) applications.

Figure 3:
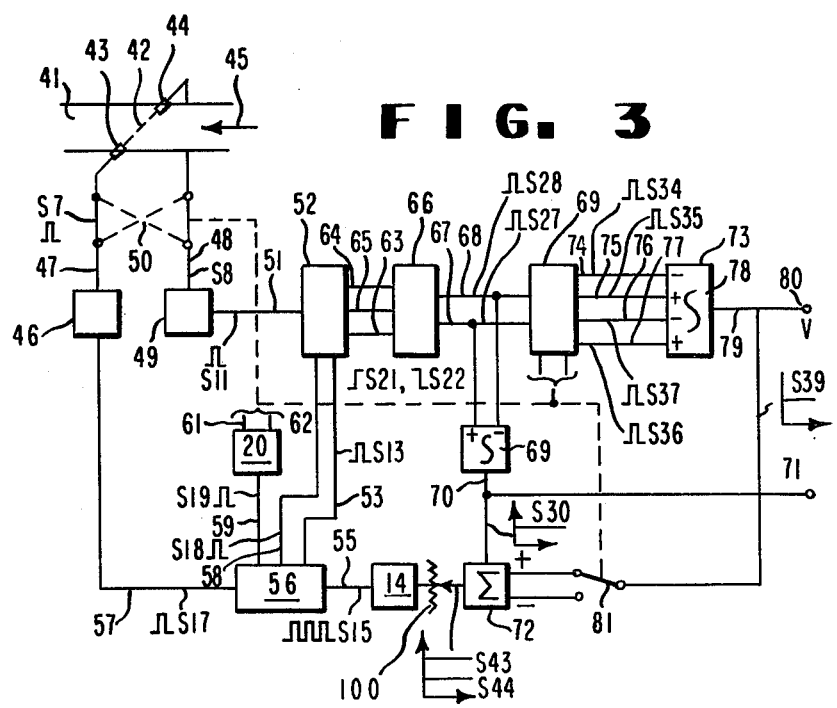
FIG. 3 is a partial block, partial schematic illustration of one type of ultrasonic measuring apparatus with which the improved sensitivity feature illustrated in FIG. 1 may be used.

There is seen in FIG. 3 a block diagram of a typical flowmeter with which this system may be used. This flowmeter is that shown in FIG. 1 of U.S. Pat. No. 3,981,191. As shown in FIG. 3, a channel 41 contains an ultrasonic measuring path 42 which is defined by two ultrasonic transducers 43 and 44 and is disposed obliquely to the direction 45 of flow of the fluent medium through the channel 41. One transmission device 46 is able to pass to the transducer 43 through the line 47 a D.C. impulse 57, which shock excites the transducer at its resonant frequency so that it thereupon passes through the medium in the channel 41 an ultrasonic signal having a frequency of, for example, 1 MHz. This signal is received by the transducer 44 at the end of the transit time and converted to an electric signal S8 which is fed through a line 48 to receiver means 49. The lines 47 and 48 are interchangeable through a switch 50 so that the transducers 43 and 44 can serve alternately as ultrasonic transmitter and as ultrasonic receiver. Alternatively separate transmitters and receivers may be employed as described in U.S. Pat. No. Re. 28,929. In the receiving means 49, a defined arrival signal S11 is obtained from the high frequency signal S8 by means of a zero crossover detector such as that described in U.S. Pat. No. Re. 28,929, the signal S11 being passed through a line 51 to a comparator means 52. This comparator means simultaneously receives through a line 53 a reference signal S13 with which the arrival signal S11 is compared on a time basis.

A voltage-controlled oscillator 54 may serve as a timing function generator; it passes its output oscillations as an impulse chain S15 to a counter 56 through a line 55. On commencement of counting, this counter delivers a transmission signal S17 to the transmission means 46 through a line 57. At a predetermined counter content, e.g., 256 impulses, the reference signal S13 is delivered. At an earlier instant (before 256 impulses), e.g., 128 impulses, a receiver readiness signal S18 was passed through a line 58 to prepare the comparator means for measurement. Subsequent to measurement, e.g., 384 impulses, the receiver readiness signal S18 is terminated, thereby disabling the receiver and comparator and protecting against shock excitation during transmission. Finally, a signal S19 is fed through a line 59 to a bistable transmission generator 60 which alternately delivers downstream signals S21 and upstream signals S22 through a pair of signal lines 61 and 62, the latter signals then switching the switch 50 over.

When an arrival signal S11 arrives in the comparator means 52, a signal of predetermined, constant amplitude and duration appears at the output 63. If this arrival signal S11 has arrived earlier than the reference signal S13, a signal appears at the output 64. If the arrival signal was determined later than the reference signal, a signal occurs at the output 65. A first row 66 of logic elements links these three output signals in such a way that in a line 67 an early signal S27 occurs having a constant amplitude and the same time duration as the signal occurring at output 63 and a late signal S28 occurs also having a constant amplitude and the same time duration as the signals occurring on outputs 63 and 65.

In an integrating signal level such as a generator integrator 69 all early signals S27 are integrated in one direction and all late signals S28 in the opposite. By way of convention, the + and − signs in the block 78 indicate the direction of integration of early signals S27 and late signals S28 which in the embodiments both have positive going polarity. For instance, the early signals could be fed to the non-inverting input and the late signals to the inverting input of an operational amplifier serving as an integrator. At the output 70 of the integrator, a main signal S30 occurs in the form of a signal level that is variable by the early and late signals. This main signal S30 can be derived directly at an output terminal 71 through an evaluating circuit such as a meter and used as a measurement for the sonic velocity c of a medium flowing through the channel 10. In addition, this main signal S30 is passed to an input of a summing circuit such as an adder 72.

The early and late signals S27 and S28 are additionally fed to a second row 73 of logic elements, which also have fed to them the downstream and upstream signals S21 and S22. In this way early upstream signals S34, early downstream signals S35, late upstream signals S36 and late downstream signals S37 are obtained at four outputs 74 to 77. A second integrating signal lever generator such as an integrator 78 is fed with the early downstream S35 with positive sign and the early upstream signals S34 with negative sign and possibly also the late downstream signals S37 with negative sign and the late upstream signals S36 with positive sign. As a result, an auxiliary signal S39 is produced at the output 79 in the form of a signal level dependent on the signals S34 to S37.

This auxiliary signal S39 is fed directly to an output terminal 80 from which the flow velocity of the medium following in the channel 41 can be taken directly through an evaluating circuit. In addition, the auxiliary signal S39 is fed through a switch 81 alternately to the positive and the negative inputs of the summating circuit or adder 72. The switch 81, which may be an analog switch, is operated by the downstream and upstream signals S21 and S22. Control signals S43 and S44 therefore alternately occur at the output 82 of the adder, these signals corresponding to the sum of or difference between, respectively, the main signal S30 and the auxiliary signal S39. These control signals S43 and S44 control the voltage-controlled oscillator 54 in such a way that the pulse train S15 alternately has a higher frequency $f_1$ associated with the downstream measurement and a lower frequency $f_2$ associated with the upstream measurement.

This results in the method of operation to be described hereinafter in conjunction with FIG. 4. Entered in the five rows 1–5 on a time reference there are the transmission signal S17, the arrival signal S11 occurring after the transit time $t_1$, and the reference signal S13 occurring after a delay period $t_2$ which may be greater than or less than $t_1$ for the downstream measurement as well as for the upstream measurement. There is also an indication as to whether the signals S30 and S39 are increasing, decreasing or remaining unchanged.

Case 1: It is assumed that all arrival signals S11 occur earlier than the reference signal S13. The result of this is that the level integrator 69 merely receives positive signals and the main signal S30 increases. On the other hand, positive and negative signals are alternately fed to the second integrator 38 so that the auxiliary signal S39 remains unchanged. Consequently, both control signals S43 and S44 increase. The frequencies $f_1$ and $f_2$ of the pulse trains from the VCO 14 increase. The delay period $t_2$ is therefore decreased in both transmission directions because the 256 impulses were on each occasion counted in a shorter period of time by the counter 56. During the respective next upstream or downstream measurement, therefore, the delay period $t_2$ has been more closely adapted to the actual transit time $t_2$. Since this procedure is repeated for each measurement, there is ultimate coincidence between the delay period and the transit time or, stated in other words, the frequencies $f_1$ and $f_2$ are a measure of or are proportional to the actual transit time $t_1$.

Case 2: All arrival signals S11 occur later than the associated reference signals S13. Exactly the opposite conditions to those in Case 1 occur. The main signal S30 decreases. The auxiliary signal S39 remains unchanged. The control signals S43 and S44 both become smaller. The frequencies $f_1$ and $f_2$ both decrease.

Case 3: During the downstream measurement the arrival signal S11 occurs earlier than the reference signal S13 and during the upstream measurement it occurs later. In this case the integrator 69 is alternately supplied with positive and negative signals so that the main signal S30 remains unchanged. On the other hand the second integrator 78 is only supplied with positive signals. Consequently the auxiliary signal S39 increases. As a result the control signal S43 and thus the frequency $f_1$ increase but the control signal S44 and thus the frequency $f_2$ decrease.

Case 4: The arrival signals S11 occur later than the reference signals S13 during the downstream measurement but earlier during the upstream measurement. The circumstances are the reverse of those in Case 3. This means that the frequency $f_1$ drops and the frequency $f_2$ rises.

Case 5: All arrival signals S11 coincide with the reference signals S13. The signal level generators 69 and 78 receive no signal. The main signal S30 and auxiliary signal S39 remain unchanged, as do the frequencies $f_1$ and $f_2$. This is an ideal condition which in practice almost never occurs.

The circuit therefore forms a regulating circuit in which solely by the statistical evaluation of the early and late signals during the upstream and downstream measurement an adjustment of the delay period $t_1$ occurs in such a way that the latter accurately coincides with the transit time $t_1$ after a few individual measurements. This regulation takes place with a relatively high accuracy independently of the quality of the components provided in the regulating circuit.

When the frequencies $f_1$ and $f_2$ occur by summation and subtraction of the main signal S30 and auxiliary signal S39, a simple calculation will show that the main signal S30 is a relatively accurate measure of or proportional to the mean value ($f_1-f_2/2$) and the auxiliary signal S39 is a relatively accurate measure of or proportional to half the difference ($f_1-f_2/2$) of the two frequencies $f_1$ and $f_2$. However, since this mean value is proportional to the sonic velocity of the medium flowing in the channel 41 and the difference is proportional to the flow velocity of this medium, one can connect output terminals 71 and 80 directly to the outputs 70 and 79 to derive signals corresponding to the sonic velocity c and flow velocity v, respectively. These signals may have an extraordinarily high accuracy because they can be derived directly from the self-compensating regulating circuit.

Instead of the time generator consisting of the oscillator 54 and counter 56, one can also use an analog time generator.

The several circuit components herein described are of conventional design and available commercially as off-the-shelf items. By way of example the transmission device 46 is simply a pulse generator which is capable of shock exciting the transducer 43. In like manner the receiver means 49 is a pulse amplifier capable of amplifying the high frequency pulse trains device from the receiving transducer 44. The switch 50 can be any suitable transistor switching circuitry. The comparator 52 may be of the type described in U.S. Pat. No. Re. 28,929, which receives the transmitted pulse trains and compares it in time phase with the reference signal and provides output signals indicative of whether the received signals are early or late with respect to the reference signal.

The voltage controlled oscillator is of a well-known design, but, for example, may be in an integrated circuit ICL8038.

The operational amplifier used in the various logic circuitry may be for the most part 301A's. The various and/or logic and NOR/NAND logic can be integrated circuits of the 7400 series. The analog switches may be CA4016 circuit chips.

In like manner the bistable transmission generator 20 may be an element similar to that described in conjunction with the U.S. Pat. No. Re. 28,929.

In its simplest form it may be a bistable multivibrator of flipflop and the counter 56 may be a conventional binary counter with suitable dividers. The remaining elements of the circuit depicted, particularly by blocks 66, 63, 78, 69 and 81, are all for the most part conventional, operational amplifier circuits; they are available from many sources.

A relatively stable integration circuit may be made utilizing an integrator circuit up-down counter, and the up-down counter has inputs that are derived in one instance from the early and late signals and in the other instance from the upstream and downstream signals correlated according to time of arrival such that the counter will count up on the receipt of downstream time correlated signals and conversely will count down upon the receipt of the upstream time correlated signals. The binary output of the counter is applied to a conventional digital analog converter which provides, as is known, an analog voltage which may be used directly to control, through suitable switching circuitry, the voltage controller oscillator.

According to this invention a potentiometer 100 is positioned between the adder 72 and time function generator 54. In this manner a signal from the adder 72 may be adjusted in amplitude prior to application to the voltage controlled oscillator or timing function generator 54. Thus, by increasing the amplitude of the signal, by adjusting the potentiometer 100, the frequency of the oscillator 54 may be increased thereby increasing the apparent sound speed of the meter as described above and hence the sensitivity of the meter.

Figures 4, 5:
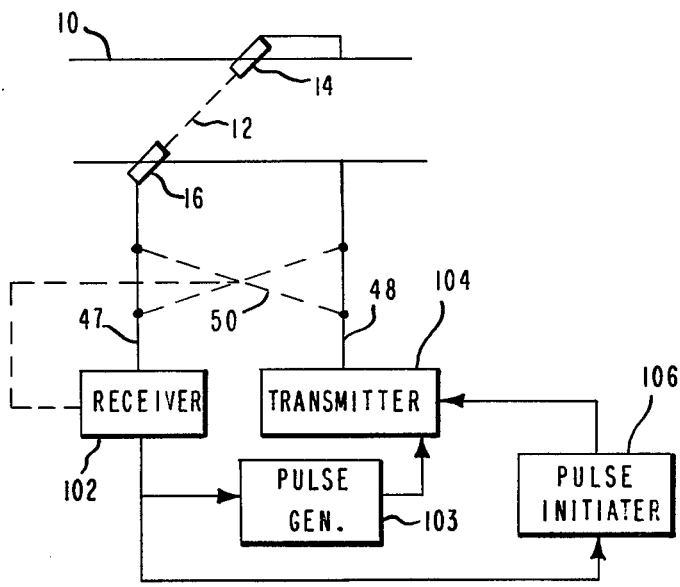
FIG. 4 is a timing diagram depicting the various operational modes of the ultrasonic measuring apparatus depicted in FIG. 3.
FIG. 5 is a blockdiagram of a sing-around type ultrasonic flowmeter modified in accordance with this invention to have a higher sensitivity.

Another embodiment of the invention, as illustrated in FIG. 5, uses a conventional "sing-around" type flowmeter in which the pipe 10 incorporates upstream and downstream transducers 14, 16 as previously described. The lines 47 and 48 are interchangeable by means of a switch 50 as described so that the transducers 14, 16 can alternately serve as ultrasonic transmitter and ultrasonic receiver. The transmitted and received signals are passed through the receiver 102 and transmitter 104. The output of the receiver is passed to a pulse generator 103 which processes the signal from the receiver and passes it to initiate the next signal from the transmitter such that the frequency with which signals are passed alternately upstream and downstream are a function of the time required for transmission along the ultrasonic measuring path 12.

This typical sing-around type flowmeter is modified in accordance with this invention by coupling the output of the receiver 102 to a pulse initiator circuit 106 which, for example, may be a one shot multivibrator. Upon receiving an initial pulse signal from the receiver, the pulse initiator circuit transmits an intermediate signal to the transmitter 104 either prior to or following the signal from the pulse generator 103 such that a sequence is started or initiated whereby, for each received signal, two sequential signals are generated by the transmitter thereby providing a double frequency. This double frequency, according to the principles previously discussed, has the effect of increasing the sensitivity of the meter and has particular application where large diameter pipes will permit such frequency doubling.

The frequency alternatively may be increased by other integral multiples simply by adding one shot multivibrators in series with the multivibrator 106, although the same limitation as that previously noted still exists, namely, that when the frequency is increased too much, the sensitivity of the meter to changes in sound speed is increased.

In all of these applications the frequency related signal representing sound speed is in effect tricked by increasing the apparent sound speed such that a received signal is associated with a transmitted signal other than the one which actually initiated the signal. More specifically, a received ultrasonic signal is associated with a transmitted ultrasonic signal following that which actually initiated the received signal. In this manner the sensitivity of the meter is increased.

We claim:

1. Apparatus for measuring the flow rate of a fluid stream by repetitively transmitting and receiving ultrasonic signals upstream and downstream over preselected distances and a timing function generator having a frequency related output signal related to sound speed in said fluid stream for controlling the times at which ultrasonic signals are so transmitted, said apparatus comprising:

control means responsive to the upstream and downstream transit times over said preselected distances of said ultrasonic signals and to said generator for providing first and second control signals that are related, respectively, to the flow velocity of said stream and the speed of sound in said fluid stream, and means including said generator responsive to said control signals for increasing the repetition rate at which said ultrasonic signals are transmitted and hence the apparent speed of sound in said fluid stream, whereby said control means associates each said received ultrasonic signal with a transmitted ultrasonic signal following that which actually initiated said received signal.

2. An apparatus according to claim 1 wherein said repetition rate is increased by a factor of two.

3. An apparatus according to claim 1 wherein said repetition rate is increased by a factor which is the ratio of the actual transit time to the actual transit time less the reciprocal of said repetition rate.

4. Apparatus for the measurement of fluid flow rate using ultrasonic signals, said apparatus having first and second transducers positioned in relative upstream and downstream locations in communication with the fluid to be measured for alternately transmitting said ultrasonic signals in opposite senses therebetween, the combination comprising:

a timing generator for controlling the transmission times of said ultrasonic signals and generating a reference signal delayed with respect to each said transmission time, comparator means for generating early and late signals according to whether the received ultrasonic signals are early or late relative to each such reference signal, a first signal level generator responsive to at least some of said early and late signals for generating a first signal level related to sound speed in said fluid, logic means responsive to said comparator means and to the sense of transmission of said ultrasonic signals for generating early and late signals correlated with transmission direction upstream and downstream, a second signal level generator responsive to at least two of said early and late signals correlated with transmission direction for generating a second signal level different than said first level related to said fluid flow rate, adder means responsive to said first and second signal levels for generating control signals related respectively to the upstream and downstream speeds of sound for controlling the timing of said timing generator, and means for adjusting said timing generator to vary said first signal level, thereby to increase the apparent sound speed in said fluid, said first signal level being adjusted to increase the apparent said sound speed until said comparator means associates a received ultrasonic signal with a transmitted ultrasonic signal, in the same direction sense, following that which actually initiated said received signal.

* * * * *